United States Patent
Glover et al.

(10) Patent No.: US 9,953,061 B2
(45) Date of Patent: Apr. 24, 2018

(54) SIMILARITY ENGINE FOR FACILITATING RE-CREATION OF AN APPLICATION COLLECTION OF A SOURCE COMPUTING DEVICE ON A DESTINATION COMPUTING DEVICE

(71) Applicant: Samsung Electronics Co., Ltd., Suwon-si, Gyeonggi-do (KR)

(72) Inventors: Eric J. Glover, Palo Alto, CA (US); Marshall James Quander, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 15/083,722

(22) Filed: Mar. 29, 2016

(65) Prior Publication Data

US 2016/0210331 A1    Jul. 21, 2016

Related U.S. Application Data

(63) Continuation of application No. 14/673,219, filed on Mar. 30, 2015, now Pat. No. 9,330,186, which is a
(Continued)

(51) Int. Cl.
*G06F 9/445* (2006.01)
*G06F 17/30* (2006.01)

(52) U.S. Cl.
CPC ......... *G06F 17/30522* (2013.01); *G06F 8/60* (2013.01); *G06F 8/61* (2013.01);
(Continued)

(58) Field of Classification Search
CPC ..... G06F 8/61; G06F 7/30864; G06F 7/30867
(Continued)

(56) References Cited

U.S. PATENT DOCUMENTS 7,146,645 B1 * 12/2006 Hellsten .............. G06F 8/61
    726/22
8,336,044 B2 * 12/2012 Wang .................. G06F 8/63
    717/168

(Continued)

OTHER PUBLICATIONS

Anonymous, "A method and process for improving the relevance of version specific technical search queries," IPCOM000222587D, IP.com, Oct. 18, 2012, 4pg.

*Primary Examiner* — Ryan D. Coyer
(74) *Attorney, Agent, or Firm* — Jefferson IP Law, LLP

(57) ABSTRACT

Techniques are disclosed for facilitating re-creation of an application collection of a source computing device at a destination computing device. The techniques include receiving a source application identifier indicative of a source application edition, the edition of the application being programmed for a source operating system. The techniques also include receiving an indicator of a destination operating system. The techniques further include determining a source canonical application corresponding to the source application edition based on the source application identifier, the source canonical application being a representative of one or more application editions including the source application edition. The techniques also include determining a set of destination application editions that are likely similar to the source application edition based on the source canonical application, the set of destination application editions indicating one or more destination application editions programmed for the destination operating system.

19 Claims, 5 Drawing Sheets

Related U.S. Application Data continuation of application No. 14/037,155, filed on Sep. 25, 2013, now Pat. No. 9,032,392, which is a continuation-in-part of application No. 13/839,068, filed on Mar. 15, 2013.

(52) U.S. Cl.
CPC .. *G06F 17/30483* (2013.01); *G06F 17/30663* (2013.01); *G06F 17/30867* (2013.01); *G06F 17/30864* (2013.01)

(58) Field of Classification Search
USPC .................................................. 717/174–178
See application file for complete search history.

(56) References Cited

U.S. PATENT DOCUMENTS

| | | | | |
|---|---|---|---|---|
| 8,365,164 | B1* | 1/2013 | Morgenstern | G06F 9/44552 717/108 |
| 8,732,696 | B2* | 5/2014 | Bukary | G06Q 10/00 705/7.11 |
| 2004/0199364 | A1* | 10/2004 | Law | G05B 9/02 702/189 |
| 2005/0165597 | A1* | 7/2005 | Nightingale | G06F 11/3672 703/27 |
| 2007/0061798 | A1* | 3/2007 | Atsatt | G06F 9/44563 717/166 |
| 2009/0260005 | A1* | 10/2009 | Nakagawa | H04L 67/1095 717/177 |
| 2011/0145327 | A1* | 6/2011 | Stewart | G06F 17/3002 709/203 |
| 2011/0276961 | A1* | 11/2011 | Johansson | G06F 8/61 717/178 |
| 2012/0072903 | A1* | 3/2012 | Joukov | G06F 8/63 717/175 |
| 2012/0117558 | A1* | 5/2012 | Futty | G06F 8/61 717/176 |
| 2012/0290441 | A1 | 11/2012 | Mahaniok et al. | |
| 2012/0316955 | A1* | 12/2012 | Panguluri | G06Q 30/02 705/14.41 |
| 2013/0290318 | A1 | 10/2013 | Shapira et al. | |
| 2013/0290319 | A1 | 10/2013 | Glover et al. | |
| 2013/0290321 | A1 | 10/2013 | Shapira et al. | |
| 2013/0290322 | A1 | 10/2013 | Prosnitz et al. | |
| 2013/0290344 | A1 | 10/2013 | Glover et al. | |
| 2014/0006409 | A1 | 1/2014 | Prosnitz et al. | |

\* cited by examiner

US 9,953,061 B2

SIMILARITY ENGINE FOR FACILITATING RE-CREATION OF AN APPLICATION COLLECTION OF A SOURCE COMPUTING DEVICE ON A DESTINATION COMPUTING DEVICE

CROSS REFERENCE TO RELATED APPLICATIONS

This U.S. patent application is a continuation of, and claims priority under 35 U.S.C. § 120 from, U.S. patent application Ser. No. 14/673,219, filed on Mar. 30, 2015, which is a continuation of U.S. patent application Ser. No. 14/037,155, filed on Sep. 25, 2013, which is a continuation-in-part of U.S. patent application Ser. No. 13/839,068, filed on Mar. 15, 2013. The disclosures of these prior applications are considered part of the disclosure of this application and are hereby incorporated by reference in their entireties.

TECHNICAL FIELD

This disclosure relates to a similarity engine for facilitating re-creation of an application collection of a source computing device on a destination computing device.

BACKGROUND

Mobile computing devices, such as smartphones and tablets, are rapidly gaining in popularity. A main reason for the rise in popularity is the widespread availability of mobile applications (commonly referred to as "apps" or "mobile apps"). These mobile applications are directed to numerous different functionalities and purposes, including but not limited to, gaming, banking, organization, shopping, education, leisure, sports, news, book readers, social networking, and messaging.

Like many applications, the software which makes up the mobile applications is typically programmed for the operating system on which the application is to execute. For example, a third party application developer may develop and provide an application intended to perform a specific function. In order to have a wide reach, the application developer may offer a first application edition of the application for the IOS operating system by Apple Inc., a second application edition of the application for the ANDROID operating system by Google Inc., and a third application edition for WINDOWS PHONE operating system by Microsoft Corp. A user can purchase or download a mobile application by visiting an application store, which may be serviced by the operating system providers or third parties.

DESCRIPTION OF DRAWINGS

Like reference symbols in the various drawings indicate like elements.

DETAILED DESCRIPTION

Figure 1A:
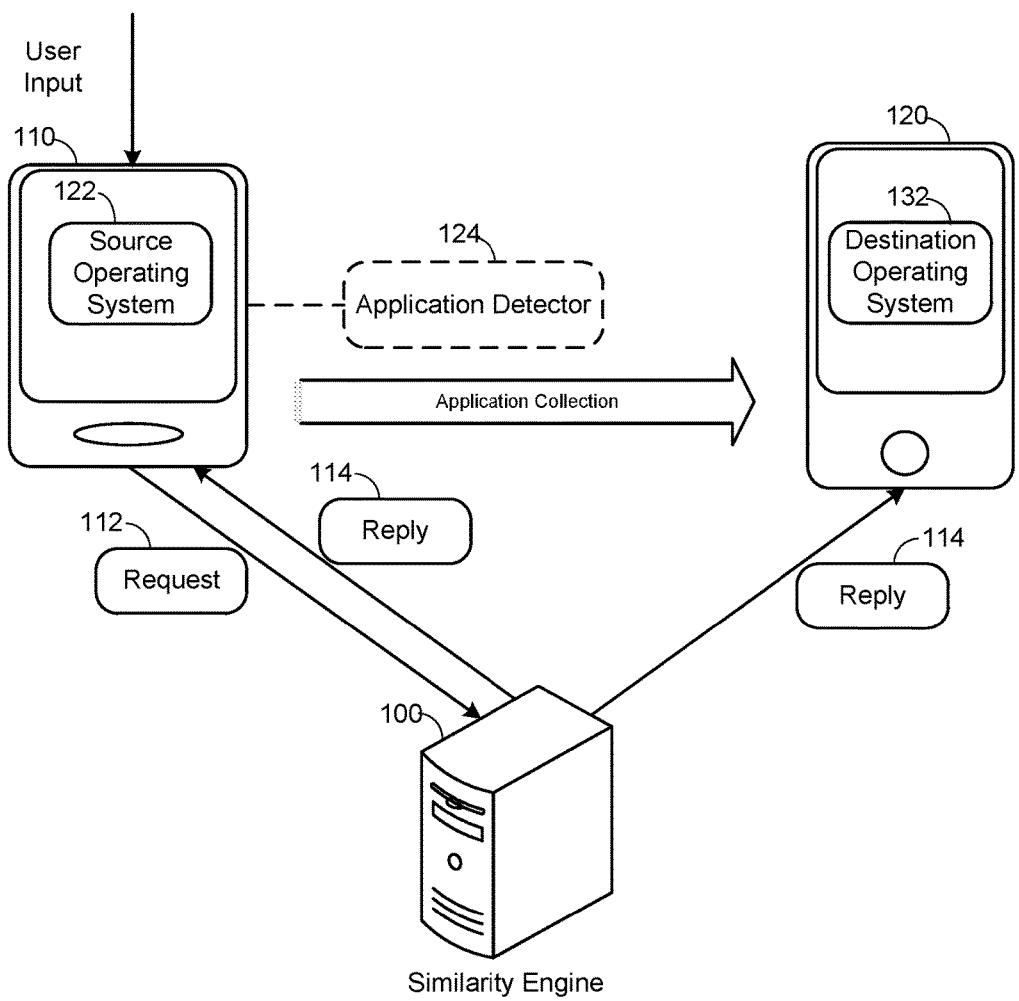
FIG. 1A is a drawing illustrating a similarity engine in communication with a source computing device and a destination computing device according to some implementations.

When users of computing devices (e.g., mobile computing devices and stationary computing devices) decide to purchase a new computing device, the users may be discouraged from switching operating systems (e.g., IOS to ANDROID or WINDOWS to IOS). One concern of users is losing the application collection of their old computing device. A similarity engine is disclosed that can help users re-create an application collection on a new device and/or allow a user to assess whether such re-creation is plausible or acceptable. The similarity engine can determine a set of applications that are programmed for a destination computing device that are similar to one or more applications that are installed on a source computing device.

As used herein, application can refer to any software that can be executed to provide a functionality or set of functionalities by a computing device. An application collection of a computing device can refer to a set of applications that are installed on or readily accessible by the computing device. An application edition can reference a specific version of an application. For example, a group of one or more application editions refers to a group of applications that are identical or similar to one another. Put another way, application editions are applications that have similar programming and/or functionality. Examples of application editions are different release versions of an application (e.g., beta version, v. 1.0, or v. 2.0), different language versions of an application (e.g., English version, Russian version, or Chinese version), different operating system versions of an application (e.g., IOS version or ANDROID version), different functional versions (e.g., a light version, an advanced user version, or a free version), different aesthetic versions (e.g., a holiday themed version or a season themed version), and different resolution versions of an application (e.g., standard definition or high definition).

As used herein, canonical application can refer to a representative of a group of similar application editions. In some implementations, a canonical application is an umbrella under which the one or more application editions are categorized. For example, a canonical application of a particular game (e.g., ANGRY BIRDS® by Rovio Entertainment Ltd.) can represent different application editions of the game (e.g., ANGRY BIRDS FREE for ANDROID, ANGRY BIRDS HD for IOS, ANGRY BIRDS for IOS, and/or ANGRY BIRDS for ANDROID). Thus, a canonical application is not necessarily an actual application, but rather an indicator of one or more related applications. It is noted that applications that are related but not similar (e.g., sequels in a series of games or a different release of serial software) are typically not classified under the same canonical application. For example, ANGRY BIRDS may be a separate canonical application from ANGRY BIRDS STAR WARS® and ANGRY BIRDS SEASONS®. Although the applications may have a same underlying concept (i.e., smashing pigs with enraged birds) the three canonical applications reference distinct games and, therefore, different groups of application editions. Conversely, "ANGRY BIRDS LITE for IOS," "ANGRY BIRDS HD for ANDROID," "ANGRY BIRDS for ANDROID," and "ANGRY BIRDS for IOS," may all be classified as application editions under the canonical application "ANGRY BIRDS."

FIG. 1A illustrates a similarity engine 100 in communication with a source computing device 110 and a destination computing device 120. While shown as a standalone computing device, the similarity engine 100 can be implemented in a larger computing system, such as a search engine or an application search engine.

The source computing device 110 is a computing device that has a current application collection installed thereon. The source computing device 110 executes an operating system. The operating system of the source computing device 110 may be referred to as a source operating system 122.

The destination computing device 120 also executes an operating system. The operating system of the destination computing device 120 may be referred to as a destination operating system 132. The destination computing device 120 can be a computing device on which re-creation of the current application collection is sought. For example, if a user currently uses the source computing device 110 and is contemplating purchasing or has purchased the destination computing device 120, the user may want to determine how much of the source application collection can be re-created on the destination operating system 132.

Figure 1B:
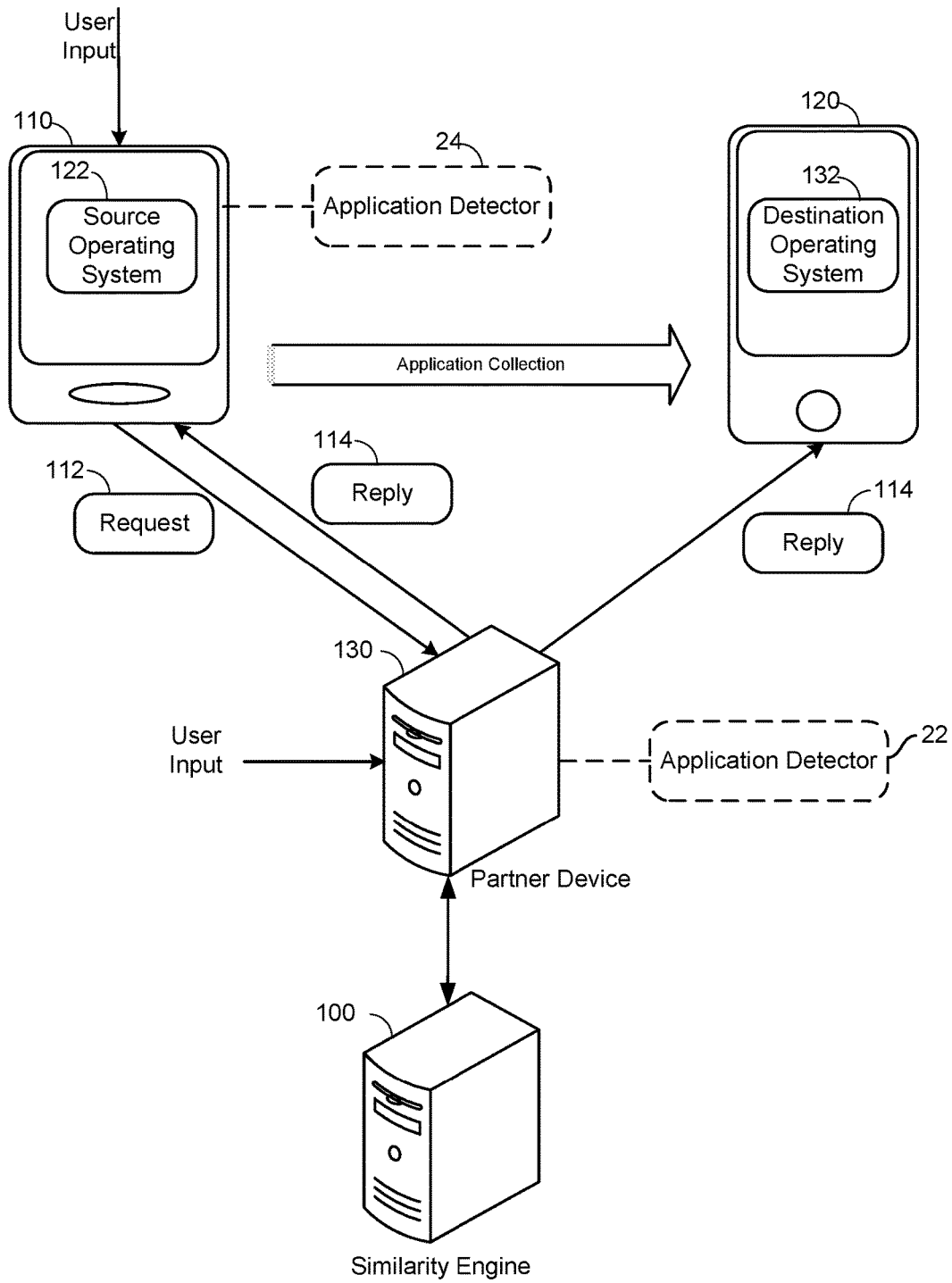
FIG. 1B is a drawing illustrating a similarity engine in communication with a partner device, which is in communication with the source computing device and the destination computing device according to some implementations.

While depicted as mobile computing devices in FIGS. 1A and 1B, the source computing device 110 and the destination computing device 120 can be any suitable user computing device. Examples of user computing devices include, but are not limited to, smartphones, tablet computers, laptop computers, stationary computers (PCs), gaming systems, personal gaming devices, refrigerators, televisions, set-top boxes, and vehicle infotainment systems. It is further noted that re-creation of the application collection is not limited to scenarios where the source computing device 110 and the destination computing device 120 are the same type of device (e.g., mobile devices). For instance, re-creation of an application collection can be sought from a stationary computer to a smartphone, from a smartphone to a vehicle infotainment system, or from a television to a vehicle infotainment system.

In some implementations, the similarity engine 100 receives a request 112 for a set of destination applications. The request 112 can include an indicator of the destination operating system 132 of the destination computing device 120 and one or more application identifiers. Each application identifier indicates a source application edition in the source application collection. The similarity engine 100 can receive the requests 112 from, for example, the source computing device 110 or another computing device associated with the source computing device 110 (e.g., another computing device of the user or a computing device of a retailer). As used herein, application identifier can refer to an indicator that identifies an application edition from other application editions. Application identifiers can be numeric, alphanumeric, and/or character based strings. In some implementations, the application identifier is the identifier that is used by an application retailer to reference a particular application edition in an application store.

For each application identifier in the request 112, the similarity engine 100 determines a set of destination applications based on the application identifier and the destination operating system 132. In some implementations the set of destination applications includes application identifiers of one or more canonical applications that have applications editions classified thereunder that are programmed for the destination operating system 132 and are likely similar to the source application edition indicated in the request 112. In this scenario, the destination application identifiers identify a canonical application. Additionally or alternatively, the set of destination applications includes application identifiers of one or more destination application editions that are programmed for the destination operating system 132 and are likely similar to the source application edition indicated in the request 112. The application identifiers that are included in the set of destination applications may be referred to as destination application identifiers. Two application editions may be considered similar if the application editions are different versions of the same application and/or if the two application editions provide comparable functionality but are classified under different canonical applications. For example, two music player application editions may be similar, even though the music player application editions are developed by two separate developers and are distinct applications. In another example, two applications may be similar when both applications are classified under the same canonical application.

The set of destination applications may be communicated to the destination computing device 120, the source computing device 110, or any other suitable device (not shown). In some implementations, the receiving device (i.e., the source computing device 110, the destination computing device 120 or otherwise) can display titles, icons, and/or descriptions of the destination application editions indicated by the set of destination applications, such that the user can select one or more of the application editions for installation on the destination computing device 120 and/or can read the descriptions of one or more of the destination applications. In some implementations, the set of destination applications may be used to facilitate the downloading of one or more destination application editions indicated by the set of destination applications to the destination computing device 120.

In some implementations, the source computing device 110 may execute an application detector 124. The application detector 124 is an application that analyzes a computing device (e.g., the source computing device 110) and determines the application collection thereof (i.e., the application editions that are installed on the computing device). The application detector 124 can search the directory files of the source computing device 110 to identify application editions that are installed on the source computing device 110. In some implementations, the application detector 124 determines the application identifiers of the identified application editions and generates the request for a set of destination applications. It is noted that the application detector 124 can be executed by any other suitable device. For instance, the application detector 124 may be executed by a personal computing device (PC) and a user could connect the source computing device 110 to the PC. Additionally or alternatively, the application detector 124 may be executed by a remote web server that the source computing device 110 could access via a network.

A user of the source computing device 110 may also provide user input via a user interface of the source computing device 110. The user input can include an indicator of the destination operating system 132. In response to receiving the user input, the application detector 124 (or a similar component) may include the indicator of the destination operating system 132 in the request 112.

The similarity engine 100 may be used in other manners. For instance, a user wishing to find an application similar to another application for a particular operating system may provide a request 112 to the similarity engine 100 from any suitable computing device. In response to the request 112, the similarity engine 100 may return a set of destination applications indicating one or more application editions that are similar to the application indicated in the request 112.

FIG. 1B is a drawing illustrating a similarity engine 100 in communication with a partner device 130, which is in communication with the source computing device 110 and the destination computing device 120. The partner device 130 may further communicate with the destination computing device 120. A partner device 130 is a computing device that is associated with, for example, a service provider, a device manufacturer, a retailer, or another third party. In some implementations, the partner device 130 may be a server, such that the partner device 130 communicates with other devices over a network, which may be wired and/or wireless. Additionally or alternatively, the partner device 130 may be a stationary computing device (e.g., PC), such that the source computing device 110 may be physically connected to the partner device 130 via, for example, a universal serial bus (USB) interface. In this way, a retailer can, for example, use the partner device 130 to show a potential customer that re-creation of an application collection of the potential customer's computing device is possible and the destination applications that can be installed on a new computing device.

The partner device 130 may receive a list of source application editions from the source computing device 110 and may generate the request 112 for the set of destination applications. In some implementations, the partner device 130 can execute the application detector 124. In these implementations, a user can connect the source computing device 110 to the partner device 130 or can access the partner device 130 via a network. The application detector 124 can identify the application editions installed on the source computing device 110. The partner device 130 can include an identifier of the destination operating system 132 and the source application identifiers of the source application editions in the request 112. The partner device 130 may determine the destination operating system 132 based on input provided by the user. The partner device 130 transmits the request 112 to the similarity engine 100.

In some implementations the request 112 can include additional parameters such as a value for a list threshold, a value for a "gaminess" tolerance, and/or a value for an importance tolerance. The list threshold is an upper limit on how many destination applications (canonical applications and/or application editions) can be recommended for each particular source application edition. For example, if the upper limit is three, the similarity engine 100 does not include more than three destination application identifiers in a set of destination applications corresponding to a source application edition.

Gaminess corresponds to a quantitative measure that indicates how likely it is that an application edition is a game. For example, gaminess may be scored on a scale of zero to one, such that one indicates that an application edition has strong characteristics of a game and a zero indicates that the application edition has little to no characteristics of a game. The gaminess value of an application edition can be calculated in any suitable manner. For example, the gaminess value of an application edition can be calculated in the manner described in U.S. Application 61/790,215, the contents of which are herein incorporated by reference. The gaminess tolerance can indicate a tolerance (e.g., 0.05) such that the gaminess value of a destination application edition must fall within the gaminess tolerance of the gaminess value of the source application edition.

An importance value corresponds to a quantitative measure of the significance of an application edition. In some implementations, an importance value can be calculated as a function of the total number of downloads of an application edition and an average rating value of the application edition. For example only, an importance value of an application edition can be calculated by normalizing a number of downloads of the application edition based on the operating system for which it was programmed and weighting each of the number of download values and the average rating of the application edition. The weighted values may be combined to obtain the importance value. The importance tolerance can indicate a tolerance (e.g., 0.10), such that the importance value of the destination application edition must fall within the importance tolerance of the importance value of the source application edition. In another example, the parameters may include an importance value threshold, such that the importance value threshold defines a minimum acceptable importance value. In still another example, an importance value can fall within a predefined range of values, (i.e., between an upper and lower threshold). It is noted that the partner device 130 may include any other additional or alternative parameters in the request 112.

In response to the request 112, the partner device 130 can receive a reply 114 from the similarity engine 100 indicating a set of destination applications for each source application indicated in the request 112. The partner device 130 can display information and/or icons corresponding to each set of destination applications or may communicate the set of destination applications to the destination computing device 120 or the source computing device 110.

A requesting device (e.g., the source computing device 110 or the partner device 130) can generate the request 112 according to an application programming interface (API). The API can define the structure of the request 112, which parameters may be included in the request 112, and the format of responses from the similarity engine 100. The API ensures that the requests 112 are generated in the appropriate format and that the receiving device (e.g., partner device 130, source computing device 110, or destination computing device 120), can display the set of destination applications to a user.

The examples of FIGS. 1A and 1B are provided for example only. The similarity engine 100 can be configured to receive requests 112 in any other suitable manner. For example, a user may access the similarity engine 100 via a web browser executing on a computing device that is not the source computing device 110, the destination computing device 120, or a partner device 130.

Figure 2:
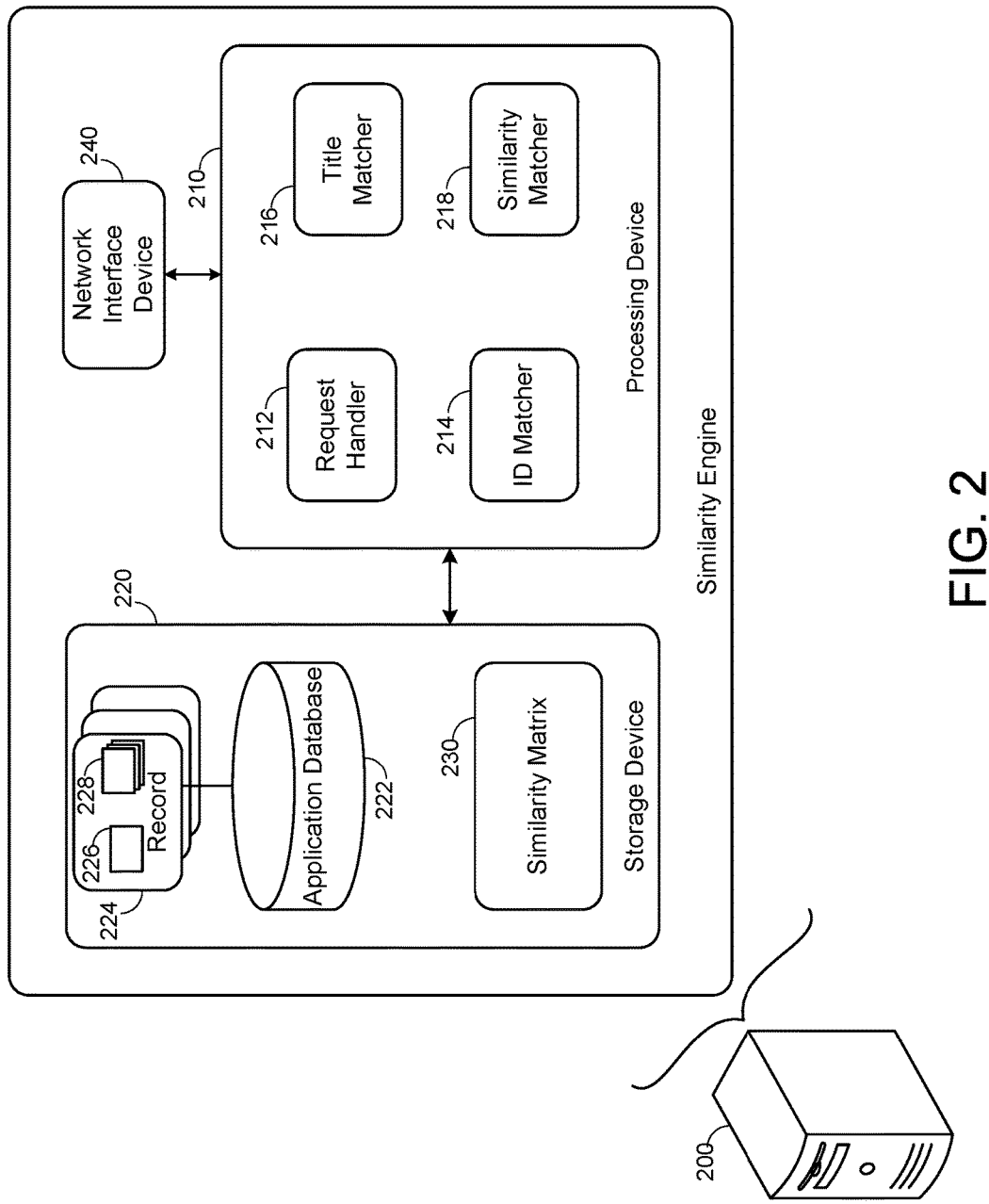
FIG. 2 is a schematic illustrating example components of a similarity engine according to some implementations.

FIG. 2 illustrates example components of a similarity engine 200 according to some implementations of the present disclosure. In some implementations, the similarity engine 200 depicted in FIG. 2 is the similarity engine 100 depicted in FIGS. 1A and 1B. It is noted that while the similarity engine 200 is illustrated as a single computing device, the similarity engine 200 may be implemented as two or more computing devices operating in a distributed or individual manner. In such implementations, the two or more computing devices can be located at the same physical location or may be distributed at two or more different physical locations and can communicate over a network. The similarity engine 200 can include a processing device 210, a storage device 220, and a network interface device 240.

The processing device 210 can include one or more processors and memory (e.g., read-only memory or random access memory). The memory stores computer-readable instructions that are executed by the one or more processors. In implementations where the processing device 210 includes more than one processor, the processors can execute in an individual or distributed manner. In some implementations the processing device 210 can execute a request handler 212, an ID matcher 214, a title matcher 216, and a similarity matcher 218, all of which are embodied as computer-readable instructions.

The storage device 220 is a non-transitory non-volatile computer readable medium. While one storage device 220 is depicted, the storage device 220 can include one or more computer readable mediums. Examples of storage devices 220 include, but are not limited to, hard disk drives, solid state drives, optical disk drives, and flash drives. In some implementations, the storage device 220 stores an application database 222 and a similarity matrix 230.

The network interface device 240 performs communication with other devices via a network. The network interface device 240 can perform wired or wireless (e.g., WiFi or cellular) communication. Examples of the network interface device 240 include, but are not limited to, a transceiver configured to perform communications using the IEEE 802.11 wireless standard, an Ethernet port, a wireless transmitter, and a universal serial bus (USB) port. While one network interface device 240 is illustrated, the term network interface device 240 can include one or more devices.

In some implementations, the request handler 212 receives a request 112 from a requesting device and provides a reply 114 indicating one or more sets of destination applications to the requesting device and/or another device. The request 112 can include one or more source application identifiers that identify respective source application editions. The request handler 212 can determine a set of destination applications for each source application edition identified in the request 112. Each set of destination applications can correspond to a different one of the source application identifiers in the request 112. For example, if the request 112 includes four different source application identifiers, the request handler 212 may include four sets of destination applications in the reply 114. In operation, the request handler 212, for each source application identifier in the request 112, identifies a canonical application 226 corresponding to the source application identifier. For each canonical application 226, the request handler 212 identifies a set of destination applications based on the canonical application 226. The set of destination applications is indicative of one or more application editions 228 that are programmed for the destination operating system 132. The set of destination applications can indicate the one or more application editions either directly (e.g., destination application identifiers that reference actual application editions 228) or indirectly (e.g., destination application identifiers that reference canonical applications 226 that have pertinent application editions 228 programmed for the destination operating system 132 classified thereunder). Put another way, the set of destination applications can identify specific application editions 228 that are similar to the source application edition and programmed for the destination application and/or can identify canonical applications 226 that are known to have application editions 228 organized under the umbrella of each canonical application 226 that are similar to the source application edition and programmed for the destination operating system. In either scenario, the set of destination applications is indicative of one or more destination application editions 228 that are programmed for the destination operating system 132.

In some implementations, the request handler 212 determines a canonical application 226 corresponding to the source application identifier by querying the application database 222 using the application identifier. The application database 222 stores a plurality of records 224, each record 224 corresponding to and referencing a different canonical application 226. Each record 224 further includes references to and data describing one or more corresponding application editions 228 and the application identifiers thereof. Furthermore, each record 224 may include attributes of the canonical application 226 and/or attributes of the application editions 228. Examples of attributes include a title of the application (canonical or edition), a developer of the application (canonical or edition), a description of the application (canonical or edition), a quality rating of the application (canonical or edition), a total number of downloads of the application, a gaminess value of the application, and an importance value of the application. The title of a canonical application 226 and/or an application edition 228 (as well as some other attributes) may be tokenized, such that the title is represented by one or more numerical values, symbols, alpha-numeric string, and the like. Tokenizing words in the application database 222 can facilitate more efficient searching. The importance value and the gaminess value may be attributed to the canonical application 226 and/or each application edition. Furthermore, in some implementations, the attributes of an application edition 228 can indicate an operating system for which the application edition 228 is programmed and/or an application store or stores from which the application edition 228 may be purchased or otherwise obtained. In these implementations, the operating system and/or the application stores may be keys, such that the canonical applications 226 and/or application editions 228 may be searched by operating system and/or application store.

In response to receiving a specific application identifier of a specific application edition 228, the application database 222 returns the canonical application 226 corresponding to the specific application edition 228. It is noted that a canonical application 226 corresponding to an application identifier of the specific application edition 228 in the source application collection can be referred to as a source canonical application 226. Additionally or alternatively, the application database 222 may return the record 224 containing a canonical application 226 in response to a query containing the specific application identifier.

In some embodiments, the request handler 212 provides parameters corresponding to the source canonical application 226 and the destination operating system 132 to one or more of the ID matcher 214, the title matcher 216, and the similarity matcher 218. The ID matcher 214, the title matcher 216, and/or the similarity matcher 218 return destination application identifiers corresponding to the source canonical application 226. The request handler 212 may limit the number of destination application identifiers that can be included in a set of destination applications, such that the number of destination application identifiers cannot exceed the list threshold. Furthermore, in some implementations the request handler 212 accesses the ID matcher 214 before the title matcher 216 and accesses the title matcher 216 before the similarity matcher 218. In these implementations, the request handler 212 stops searching for additional destination applications when the number of returned destination application identifiers equals the list threshold. By accessing the ID matcher 214 prior to the title matcher 216 and the similarity matcher 218, the request handler 212 attempts to identify application editions 228 that are more likely to be similar to the source application edition 228.

In various implementations, the ID matcher 214 identifies any application editions 228 programmed for the destination operating system 132 that are organized under the source canonical application 226. If the ID matcher 214 identifies any such application editions 228, the ID matcher 214 returns the application identifiers of the application editions 228 to the request handler 212. For example, if the source canonical application 226 is ANGRY BIRDS and the destination operating system 132 is ANDROID, the ID matcher 214 can return destination application identifiers of ANGRY BIRDS FREE for ANDROID, ANGRY BIRDS HD for ANDROID, and ANGRY BIRDS for ANDROID. Additionally or alternatively, the ID matcher 214 can return to the request handler 212 a parameter (e.g., a flag) that indicates that the source canonical application includes one or more application editions that are programmed for the destination operating system 132.

The title matcher 216 identifies any application editions 228 that have exactly matching titles and/or application editions 228 having weakly matching titles with the canonical application 226, such that the identified application editions 228 are programmed for the destination operating system 132. Two titles are said to be exactly matching if the titles contain identical sets of words in the same order. Two titles are said to be weakly matching if the titles contain the same set of non-stop words in the same order. In addition to commonly used words (e.g., "the," "and," "or," and "of"), stop words can include words that are common in application titles. For example, stop words can include terms such as "free," "lite," "HD," and "full." A list of stop words can be manually curated or can be learned over time. Non-stop words are words that are not considered stop words. In an example, ANGRY BIRDS HD and ANGRY BIRDS LITE are weakly matching titles because HD and LITE are stop words and, thus, the titles include the same set of non-stop words in order (i.e., ANGRY and BIRDS). The application editions 228 that are identified by the title matcher 216 are classified under a canonical application 226 other than the source canonical application 226. If the title matcher 216 identifies any application editions 228 having exactly matching or weakly matching titles, the title matcher 216 returns the application identifiers of the application editions 228 corresponding to the destination operating system 132 to the request handler 212. Additionally or alternatively, the title matcher 216 can return the application identifiers of the canonical applications 226 having application editions 228 whose titles exactly match or weakly match the title of the source application edition 228 and are programmed for the destination operating system 132. While the foregoing examples are provided for English, the underlying principles apply to other languages (e.g., French, Japanese, German, and Chinese).

The similarity matcher 218 identifies application editions 228 that are similar to the source canonical application 226 and are programmed for the destination operating system 132. The similarity matcher 218 references the similarity matrix 230 to determine M applications most similar to the canonical application 226. M is an integer that is greater than or equal to 0 and less than or equal to the list threshold. In some implementations M is equal to the difference between the list threshold and the amount of destination application editions 228 identified by the ID matcher 214 and the title matcher 216. The similarity matcher 218 can return M destination application identifiers to the request handler 212.

The similarity matrix 230 stores a similarity score for each ordered pair of canonical applications 226 in the application database 222. Thus, if there are N canonical applications 226 in the application database 222, the similarity matrix 230 may be an N×N matrix having the following structure:

|       | $C_1$ | $C_2$ | $C_3$ | ... | $C_N$ |
|-------|-------|-------|-------|-----|-------|
| $C_1$ | 1     | $S_{1,2}$ | $S_{1,2}$ | ... | $S_{1,N}$ |
| $C_2$ | $S_{2,1}$ | 1 | $S_{2,3}$ | ... | $S_{2,N}$ |
| $C_3$ | $S_{3,1}$ | $S_{3,2}$ | 1 | ... | $S_{3,N}$ |
| ...   | ...   | ...   | ...   | 1   | ...   |
| $C_N$ | $S_{N,1}$ | $S_{N,2}$ | $S_{N,3}$ | ... | 1   |

A similarity score $S_{i,j}$ is a quantitative measure of how similar a given application, $C_j$, is to another application, $C_i$. The similarity score $S_{i,j}$ can be calculated in any suitable manner. In some implementations, the score is calculated according to:

$$S_{i,j}=f(LSI_{i,j},TS_{i,j},I_j) \quad (1)$$

where, $LSI_{i,j}$ is the latent semantic indexing cosine-similarity score of the ith application, $C_i$, and the jth application, $C_j$, $TS_{i,j}$ is the text similarity score of the ith application, $C_i$, and the jth application, $C_j$, and $IS_i$ is the importance value of the jth application, $C_j$. It is noted that additional or alternative attributes of the ith and jth applications may be utilized to calculate a similarity score. Further, heuristic and natural language processing techniques may be applied to determine the attributes that are used to determine the similarity scores. The similarity matrix 230 can be calculated offline and can be updated in any suitable manner.

In operation, the similarity matcher 218 can identify the row in the similarity matrix 230 corresponding to the canonical application 226 and can rank the similarity scores contained therein. Based on the ranked similarity scores, the similarity matcher 218 can then determine the M highest scored canonical applications 226 that include application editions 228 that are programmed for the destination operating system 132. The similarity matcher 218 can then select an application edition 228 from each one of the M highest scored canonical applications 226 to include in the set of destination applications. The similarity matcher 218 can select the application edition 228 to recommend based on any suitable criteria. For example, when more than one application editions 228 corresponding to a canonical application 226 are programmed for the destination operating system 132, the similarity matcher 218 can select the most popular application edition 228 (e.g., most downloaded), the highest rated application edition 228, the most expensive application edition 228, the cheapest application edition 228, etc. The similarity matcher 218 can return the application identifiers of the selected application editions 228 to the request handler 212. Additionally or alternatively, the similarity matcher returns the application identifiers of the M highest scored canonical applications 226 that include application editions 228 that are programmed for the destination operating system 132.

In cooperation with the ID matcher 214, the title matcher 216, and/or the similarity matcher 218, the request handler 212 identifies a set of destination applications for each source canonical application 226 indicated in the request 112 and generates a reply 114 to the request 112 based on the sets of destination applications. The request handler 212 generates the reply 114 by including the sets of destination applications in the reply 114, along with any additional information. For instance, the reply 114 can further include the name of each destination application (canonical application and/or destination application edition), an icon or graphic of each destination application, a description of each destination application, and/or links to download each of the destination applications in the reply 114.

Figure 3:
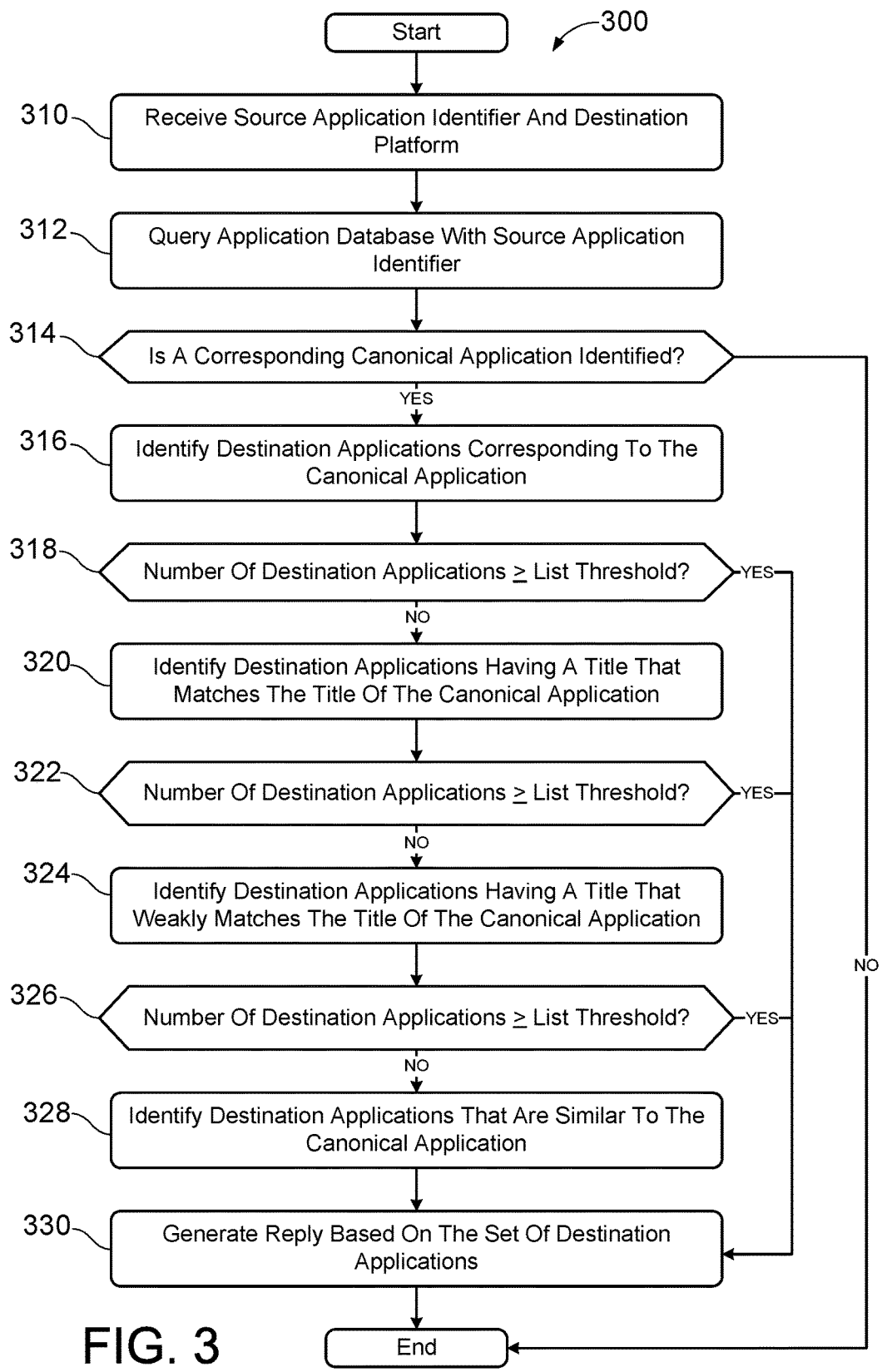
FIG. 3 is a flow chart illustrating an example set of operations of a method for determining a set of destination applications corresponding to a source application edition according to some implementations.

FIG. 3 is a flow chart illustrating an example set of operations of a method 300 for identifying a set of destination application editions 228 corresponding to a source application edition 228. The method 300 is explained with reference to the similarity engine 200 and may be executed by the processing device 210 of the similarity engine 200. It is noted, however, that the method 300 may be executed by any other suitable device. Furthermore, the method 300 is explained with respect to a single source application edition 228. It should be appreciated that the method 300 may be performed for a plurality of source application editions 228.

At operation 310, the request handler 212 receives a source application identifier and an indicator of a destination operating system 132. The source identifier and the indicator of the destination operating system 132 may be received in a request 112 for a set of destination applications. As previously discussed, the source application identifier can uniquely identify an application edition 228 installed on a source computing device 110. The source application identifier and the destination operating system 132 can be received in the request 112. The request 112 may also include additional parameters such as a list threshold, a gaminess tolerance, and/or an importance tolerance.

At operation 312, the request handler 212 queries the application database 222 with the source application identifier. At operation 314, the request handler 212 determines whether the application database 222 includes a record 224 that includes the source application identifier. If so, the application database 222 can return the record 224. The record 224 includes the canonical application 226 corresponding to the referenced application edition 228 (i.e., the source canonical application 226) and references to any other application editions 228 that have been organized under the canonical application 226. Thus, if the application database 222 returns a record 224 containing the source application identifier, the request handler 212 identifies a source canonical application 226 corresponding to the source application identifier and the method 300 continues to execute. If no such record 224 is returned by the application database 222, the request handler 212 determines that the application database 222 does not recognize the source application identifier and the request handler 212 may return an empty set of destination applications for the source application identifier.

At operation 316, the ID matcher 214 identifies application editions 228 that are organized under the canonical application 226 and programmed for the destination operating system 132. The ID matcher 214 can select application editions 228 in the record 224 returned by the application database 222 based on the destination operating system 132. In this way, the ID matcher 214 obtains application editions 228 programmed for the destination operating system 132 and organized under the same canonical application 226 as the source application edition 228. The ID matcher 214 returns application identifiers of the selected application editions 228 to the request handler 212. The request handler 212 can include the received application identifiers in the set of destination applications. In some implementations, the ID matcher 214 limits the number of application editions 228 to a predetermined limit based on one or more predetermined rules. Additionally or alternatively, the ID matcher 214 can return to the request handler 212 a parameter (e.g., a flag) that indicates that the source canonical application includes one or more application editions that are programmed for the destination operating system 132.

In an example, the source application edition 228 is ANGRY BIRDS HD for IOS (i.e., IOS is the source operating system 122) and the destination operating system 132 is ANDROID. In this example, the ID matcher 214 determines the canonical application 226 corresponding to the application edition 228 ANGRY BIRDS HD for IOS (e.g., ANGRY BIRDS). Next, the ID matcher 214 identifies other application editions 228 classified under the ANGRY BIRDS canonical application 226 that are configured for the ANDROID operating system (e.g., ANGRY BIRDS FREE for ANDROID, ANGRY BIRDS for ANDROID, and/or ANGRY BIRDS HD for ANDROID). The ID matcher 214 can obtain the application identifier of these application editions 228 from the record 224 of ANGRY BIRDS and can return the application identifiers to the request handler 212. Additionally or alternatively, the ID matcher 214 can obtain the application identifier of the ANGRY BIRDS canonical application and can return the application identifier to the request handler 212.

At operation 318, the request handler 212 determines whether the number of destination application identifiers in the set of destination applications is greater than or equal to the list threshold. If so, the request handler 212 returns the set of destination applications, as shown at operation 330. Otherwise, the request handler 212 continues to identify destination application editions 228 to include in the set of destination applications.

At operation 320, the title matcher 216 searches the application database 222 for applications having titles that exactly match the title of the source application edition 228. The title matcher 216 can search the application database 222 for application editions 228 classified under canonical applications 226 other than the source canonical application 226 that have titles that exactly match the title of the source application edition 228. Two titles are said to exactly match if the respective titles of the application editions 228 include the same set of words arranged in the same sequence. In some implementations, the titles of the application editions 228 are tokenized. In these implementations, the title matcher 216 queries the application database 222 with a token (or tokens) representing the title of the source application edition 228. In other implementations, the application database 222 is searched for exact matches of text strings. The application database 222 can return records 224 of application editions 228 whose tokenized titles contain the exact same set of tokens.

In some implementations, the title matcher 216 can verify the identified application editions 228. Verification of an application edition 228 can refer to a technique by which the title matcher 216 determines whether an application edition 228 is likely to be an adequate substitute for the source application edition 228. Examples of verification techniques can include verification based on gaminess values and verification based on importance values. In some implementations, the title matcher 216 verifies a potential destination application edition 228 by comparing the gaminess value of the potential destination application edition 228 with the gaminess value of the source application (edition or canonical). The title matcher 216 can verify the potential destination application edition 228 if its gaminess value and the gaminess value of the source application edition 228 are within the gaminess tolerance. For example, the title matcher 216 can verify a potential destination application edition 228 if:

$$|G_E - G_S| \leq T_G$$

where $G_E$ is the gaminess value of the potential destination application edition 228, $G_S$ is the gaminess value of the source application edition 228, and $T_G$ is the gaminess tolerance.

In some implementations, the title matcher 216 verifies a potential destination application edition 228 by comparing the importance value of the potential destination application edition 228 with the importance value of the source application edition 228. The title matcher 216 can verify the potential destination application edition 228 if its importance value and the importance value of the source application edition 228 are within the importance tolerance. For example, the title matcher 216 can verify the potential destination application edition 228 if:

$$|I_E - I_S| \leq T_I$$

where $I_E$ is the importance value of the potential destination application edition 228, $I_S$ is the importance value of the source application edition 228, and $T_I$ is the importance tolerance.

In some implementations, the title matcher 216 verifies a potential destination application edition 228 if it is able to verify the application edition 228 based on both gaminess values and importance values. If the title matcher 216 verifies a potential destination application edition 228, the title matcher 216 can return the application identifier of the verified application edition 228 to the request handler 212. Additionally or alternatively, for each identified application edition 228, the title matcher 216 can return an application identifier of the canonical application 226 that includes the verified application edition to the request handler 212.

At operation 322, the request handler 212 determines whether the number of destination application identifiers in the set of destination applications is greater than or equal to the list threshold. If so, the request handler 212 returns the set of destination applications, as shown at operation 330. Otherwise, the request handler 212 continues to identify destination application editions 228 to include in the set of destination applications.

If the number of destination application identifiers in the set of destination applications is less than the list threshold, the title matcher 216 can search for application editions 228 having titles that weakly match the title of the source application edition 228 and are configured for the destination operating system 132, as shown at operation 324. The title matcher 216 can search the application database 222 for application editions 228 having titles that include the same set of non-stop words, in the same order as the title of the source application edition. For example, if a first title is CHESS PRO FREE and a second title is CHESS PRO HD, then the two titles are weakly matched because the two titles include the words "CHESS PRO" but are not exact matches. If, however, the first title is CHESS PRO LITE and the second title is CHESS PLAYER LITE, then the two titles are not weakly matched because the titles do not share the same set of non-stop words. In this example, both titles contain the word "CHESS," but one title contains the word PLAYER and the other title contains the word "PRO." Thus, the titles are not considered weakly matched.

In some implementations, the title matcher 216 identifies application editions 228 having titles that weakly match the title of the source application edition 228 by removing the stop words from the title of the source application edition 228 and searching the application database 222 with the remaining words of the title. In some of these implementations, the title matcher 216 can remove the stop words from the title of each application edition 228 and can tokenize the remaining word or words in the title. The tokenized title of each application edition 228 may be stored in its corresponding record 224. The title matcher 216 can identify canonical applications 226 having titles that are weakly matched with the title of the source canonical application 226 by querying the application database 222 with the tokens representing the non-stop words of the title of the source application edition 228. The application database 222 returns records 224 of application editions 228 having titles that contain the same set of tokens. The title matcher 216 can then select application editions 228 programmed for the destination operating system 132 from the returned records 224 so as to obtain destination application editions 228 that have a title that weakly matches the title of the source application edition 228. In some implementations, the title matcher 216 can verify each of these application editions 228 in the manner described above. For example, the title matcher 216 can verify an application edition 228 based on its gaminess value and/or based on its importance value. The title matcher 216 can return the application identifiers of the verified application editions 228 to the request handler 212. Additionally or alternatively, for each identified application edition 228, the title matcher 216 can return an application identifier of the canonical application 226 that includes the verified application edition to the request handler 212.

At operation 326, the request handler 212 determines whether the number of destination application editions 228 identified in the set of destination applications is greater than or equal to the list threshold. If so, the request handler 212 returns the set of destination applications, as shown at operation 330. Otherwise, the request handler 212 continues to seek out destination application editions 228 to include in the set of destination applications.

At operation 328, the similarity matcher 218 identifies applications that are similar to the source canonical application 226. In some implementations, the similarity matcher 218 references the similarity matrix 230, and in particular, a row of the similarity matrix 230 corresponding to the source canonical application 226. As previously described, each row of the similarity matrix 230 corresponds to a different canonical application 226 and each element within the row (i.e., each successive column) represents a similarity score between the canonical application 226 and another canonical application 226 stored in the application database 222. In this way, the similarity scores for each combination of canonical application 226 pairs are represented in the similarity matrix 230. The similarity matcher 218 can sort or rank the similarity scores contained in the row of the identified canonical application 226. Based on the sorted similarity scores, the similarity matcher 218 can ascertain the canonical applications 226 that are most similar to the source canonical application 226. The similarity matcher 218 can select up to M canonical applications 226 that are most similar to the source canonical application 226, such that the selected canonical applications 226 include application editions 228 that are programmed for the destination operating system 132. M is an integer value corresponding to the difference between the list threshold and the number of destination application identifiers in the set of destination applications. In some implementations, the similarity matcher 218 can identify these canonical applications 226 by identifying records 224 having the highest similarity scores which include at least one reference to an application edition 228 that is programmed for the destination operating system 132. The similarity matcher 218 can return up to M application identifiers of the M canonical applications to the request handler 212.

Additionally or alternatively, the similarity matcher 218 can return up to M application identifiers of M application editions 228, whereby each of the M application editions 228 corresponds to a different one of the M canonical application 228. The similarity matcher 218 can select an application edition 228 from the respective record 224 of each identified canonical application 226. The similarity matcher 218 can select the application edition 228 based on the operating system for which it was programmed (i.e., application editions 228 programmed for the destination operating system 132) and other considerations such as popularity, rating, or price. As a result, the similarity matcher 218 determines the application editions 228 that are most similar to the source canonical application 226 and programmed for the destination operating system 132. The similarity matcher 218 can return the application identifiers of these application editions 228 to the request handler 212, which can include the application identifiers in the set of destination applications.

In some implementations, the similarity matcher 218 analyzes the similarity matrix 230 to identify all of the similarity scores in the row of the source canonical application 226 that are above a score threshold (e.g., 0.90). The similarity matcher 218 can obtain the records 224 of the canonical applications 226 corresponding to these scores and can select the canonical applications 226 having applications editions 228 that are programmed for the destination operating system 132. In this way, the similarity matcher 218 determines all of the canonical applications that have similarity scores that are greater than the score threshold and that have application editions 228 that are programmed for the destination operating system 132. The similarity matcher 218 can sort and/or rank these application editions 228 based on their respective similarity scores. The similarity matcher 218 can then select up to M canonical applications and/or M application editions 228 having the highest similarity scores for inclusion in the set of destination applications. The similarity matcher 218 can return the application identifiers of the M selected canonical applications and/or application editions 228 to the request handler 212.

At operation 330, the request handler 212 generates a reply 114 based on the returned application identifiers. The request handler 212 can include the application identifiers in the set of destination applications. The request handler 212 can generate the reply 114 according to the API and can include each destination application identifier of the set of destination applications in the reply 114. The request handler 212 can obtain the additional information corresponding to each of the destination applications (e.g., name of the destination application and icon of the destination application), and can include the additional information in the reply 114. It is noted that the reply 114 may also include sets of destination applications corresponding to other source application identifiers received in the request 112. The request handler 212 can provide the reply 114 to the requesting device or any other suitable device, such that information relating to the identified destination applications (e.g., name, icon, and/or screen shot of the destination application) can be displayed to the user.

The method 300 described with respect to FIG. 3 is provided for example only and not intended to be limiting. Variations of the method 300 are contemplated and are within the scope of the disclosure.

It is noted that in some scenarios the source operating system 122 and destination operating system 132 may be different operating systems. In other scenarios, however, the source operating system 122 and destination operating system 132 may be the same operating system, but re-creation of the application collection may still be desired on a destination device due to factors that are not operating system related. For example, the source operating system 122 of the source computing device 110 and the destination operating system 132 of the destination computing device 120 may be the same, but the destination operating system 132 may be configured to access a different application store. It is noted that the techniques disclosed herein are applicable to such a situation.

Figure 4:
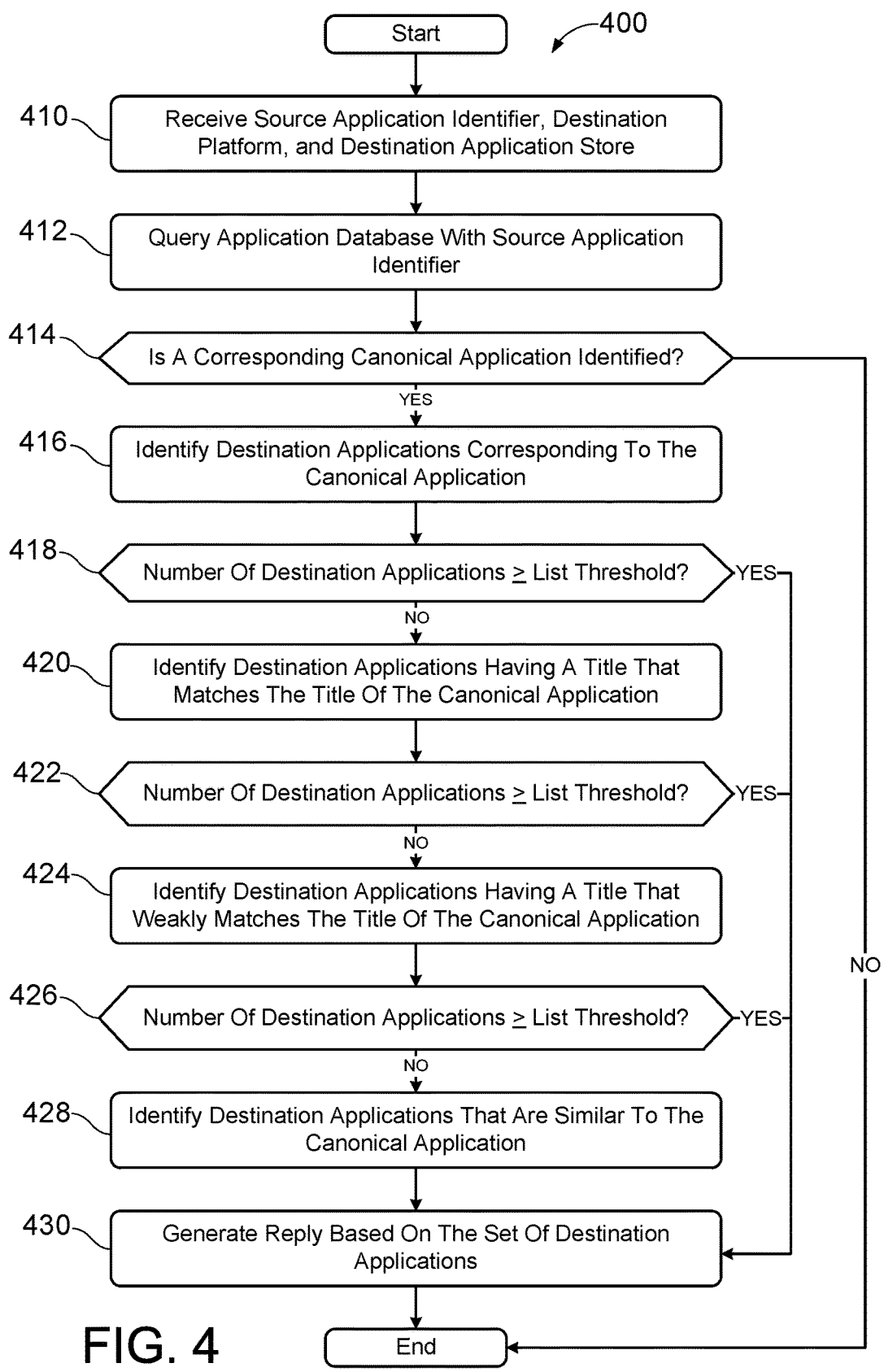
FIG. 4 is a flow chart illustrating an example set of operations of a method for determining a set of destination applications corresponding to a source application edition according to some implementations.

FIG. 4 illustrates an example set of operations for a method 400 for identifying a set of destination application editions 228 corresponding to a source application edition 228 according to some implementations of the present disclosure. The method 400 is explained with reference to the similarity engine 200. It is noted, however, that the method 400 may be executed by any other suitable device. Furthermore, the method 400 is explained with respect to a single source application edition 228. It should be appreciated that the method 400 may be performed for a plurality of source application editions 228.

At operation 410, the request handler 212 receives a source application identifier, an indicator of a destination operating system 132, and an indicator of a destination application store. The foregoing parameters may be included in the request 112 for a set of destination applications. The indicator of the destination operating system 132 can identify the operating system of the destination computing device 120. It is noted that the destination operating system 132 can be different or the same as the source operating system 122 of the source computing device 110. The indicator of the destination application store can identify an application store that the destination operating system 132 is configured to access. The request 112 may include additional parameters.

At operation 412, the request handler 212 queries the application database 222 with the source application identifier. At operation 414, the request handler 212 determines whether the application database 222 includes a record 224 that includes the source application identifier. If the application database 222 returns a record 224 containing the source application identifier, the request handler 212 identifies a source canonical application 226 corresponding to the source application identifier and the method 400 continues to execute. If no such record 224 is returned by the application database 222, the request handler 212 determines that the application database 222 does not recognize the source application identifier and the request handler 212 can return an empty set of destination applications for the source application identifier.

At operation 416, the ID matcher 214 identifies any application editions 228 that are organized under the canonical application 226, programmed for the destination operating system 132, and available on the destination application store. The ID matcher 214 returns one or more application identifiers of the selected application editions 228 to the request handler 212. The ID matcher 214 can select the application editions 228 to include in the set of destination applications based on the destination operating system 132, the destination application store, and/or one or more parameters such as popularity, rating, or price. Additionally or alternatively, the ID matcher 214 can return to the request handler 212 a parameter (e.g., a flag) that indicates that the source canonical application includes one or more application editions that are programmed for the destination operating system 132.

At operation 418, the request handler 212 determines whether the number of destination application identifiers in the set of destination applications is greater than or equal to the list threshold. If so, the request handler 212 returns the set of destination applications, as shown at operation 430. Otherwise, the request handler 212 continues to identify destination application editions 228 to include in the set of destination applications.

At operation 420, the title matcher 216 searches the application database 222 for application editions 228 having titles that exactly match the title of the source application edition 228 and are programmed for the destination operating system 132 and available at the destination retailer store. In some implementations, the title matcher 216 searches the application database 222 for other application editions 228 that have a title that exactly matches the title of the source application edition 228 in the manner described above. To the extent the title matcher 216 identifies multiple application editions that have titles that exactly match the title of the source application edition 228, the title matcher 216 can select one or more of the application editions 228 based on the destination operating system 132, the destination application store, and/or one or more parameters such as popularity, rating, or price. In some implementations, the title matcher 216 verifies the application editions 228, as was described above. The title matcher 216 can return application identifiers of the identified application editions 228 to the request handler 212. Additionally or alternatively, for each identified application edition 228, the title matcher 216 can return an application identifier of the canonical application 226 that includes the identified application edition 228 to the request handler 212.

At operation 422, the request handler 212 determines whether the number of destination application identifiers in the set of destination applications is greater than or equal to the list threshold. If so, the request handler 212 returns the set of destination applications, as shown at operation 430. Otherwise, the request handler 212 continues to identify destination application editions 228 to include in the set of destination applications.

At operation 424, the title matcher 216 searches for canonical applications 226 having titles that weakly match the title of the source canonical application 226 and that are programmed for the destination operating system 132 and available at the destination retailer store. In some implementations, the title matcher 216 searches the application database 222 for application editions 228 having titles that share the same set of non-stop words with the title of the source canonical application 226. The title matcher 216 can perform the searches in any suitable manner, including the manner described above. To the extent that the title matcher 216 identifies multiple application editions 228 which have titles that weakly match the title of the source application edition 228, the title matcher 216 can select the application editions 228 based on the destination operating system 132, the destination application store, and/or one or more parameters such as popularity, rating, or price. In some implementations, the title matcher 216 verifies the application editions 228, as was described above. The title matcher 216 can return application identifiers of the identified application editions 228 to the request handler 212. Additionally or alternatively, for each identified application edition 228, the title matcher 216 can return an application identifier of the canonical application 226 that includes the identified application edition 228 to the request handler 212.

At operation 426, the request handler 212 determines whether the number of destination application editions 228 identified in the set of destination applications is greater than or equal to the list threshold. If so, the request handler 212 returns the set of destination applications, as shown at operation 430. Otherwise, the request handler 212 continues to seek out destination application editions 228 to include in the set of destination applications.

At operation 428, the similarity matcher 218 identifies applications that are similar to the source canonical application 226. In some implementations, the similarity matcher 218 references the similarity matrix 230, and in particular, a row of the similarity matrix 230 corresponding to the source canonical application 226 to identify similar canonical applications 226. From the records 224 of the similar canonical applications 226, the similarity matcher 218 can identify application editions 228 that are similar to the source application edition 228, programmed for the destination operating system 132, and available at the destination retailer store. The similarity matcher 218 can identify similar applications in any suitable manner, including the manner described above. The similarity matcher 218 can return application identifiers of the most similar canonical applications 226 and/or application identifiers of application editions 228 classified under the most similar canonical applications 226 that are programmed for the destination operating system 228.

At operation 430, the request handler 212 generates a reply 114 based on the set of destination applications. The request handler 212 can generate the reply 114 according to the API and can include each destination application identifier of the set of destination applications in the reply 114. The request handler 212 can include additional information corresponding to each of the destination applications (e.g., a name of the destination application and an icon of the destination application), and in the reply 114. It is noted that the reply 114 may include more than one set of destination applications, such that each set of destination applications corresponds to a respective source application identifier that was in the request 112 for destination applications. The request handler 212 can communicate the reply 114 to the requesting device or any other suitable device.

The method 400 described with respect to FIG. 4 is provided for example only and not intended to be limiting. Variations of the method 400 are contemplated and are within the scope of the disclosure.

Various implementations of the systems and techniques described within the specification can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include computer instructions for a programmable processor, and can be implemented in a high-level procedural and/or object-oriented programming language, and/or in assembly/machine language. As used herein, the terms "computer-readable medium" and "computer-readable medium" refer to any computer program product, non-transitory computer readable medium, apparatus and/or device (e.g., magnetic discs, optical disks, memory, Programmable Logic Devices (PLDs)) used to provide computer instructions and/or data to a programmable processor, including a computer-readable medium that receives computer instructions as a computer-readable signal. The term "computer-readable signal" refers to any signal used to provide computer instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products (i.e., one or more modules of computer program instructions encoded on a computer readable medium for execution by, or to control the operation of, data processing apparatus). The computer readable medium can be a computer-readable storage device, a computer-readable storage substrate, a memory device, a composition of matter effecting a computer-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, (e.g., code that constitutes processor firmware, a protocol stack, a database management system, an operating system, or a combination of one or more of them). A propagated signal is an artificially generated signal (e.g., a computer-generated electrical, optical, or electromagnetic signal), that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device (e.g., a mobile telephone, a personal digital assistant (PDA), a mobile audio player, a Global Positioning System (GPS) receiver, to name just a few). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device (e.g., a CRT (cathode ray tube), LCD (liquid crystal display) monitor, or touch screen) for displaying information to the user and optionally a keyboard and a pointing device (e.g., a mouse or a trackball), by which the user can provide input to the computer. Other kinds of devices can be used to provide interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component (e.g., as a data server), or that includes a middleware component (e.g., an application server), or that includes a frontend component (e.g., a client computer) having a graphical user interface or a Web browser through which a user can interact with an implementation of the subject matter described in this specification, or any combination of one or more such backend, middleware, or frontend components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
  receiving, at a processing device, a source application identifier from a user device, the source application identifier indicating a source application edition programmed for a source operating system of the user device, the source application edition corresponding to a source canonical application representing one or more application editions including the source application edition;
  determining, at the processing device, a set of one or more destination application editions that are similar to the source application edition based on the source canonical application, wherein the set of destination application editions are programmed for a destination operating system, wherein determining the set of destination application editions includes:
    determining whether the source canonical application represents a specific application edition programmed for the destination operating system; and
    when the specific application edition is represented by the source canonical application:
      including a destination application identifier of the specific application edition in the set of destination application editions; and
      determining a link to a web page of a digital application store corresponding to the destination operating system;
  generating, by the processing device, a reply based on the set of destination application editions, the reply including display data corresponding to the set of destination application editions and, for each destination application edition, the link to the webpage; and
  providing, from the processing device, a reply to the user device, wherein the user device displays information corresponding to the one or more destination application editions based on the display data.

2. The method of claim 1, wherein determining whether the source canonical application represents the specific application edition includes:
  determining the source canonical application based on the source application identifier; and
  determining whether an application identifier of the specific application edition programmed for the destination operating system is associated with the source canonical application.

3. The method of claim 2, wherein determining the source canonical application includes querying an application database with the source application identifier, wherein the application database stores a plurality of records including a record of the source canonical application, each record indicating a respective canonical application and references to one or more application editions represented by the canonical application, each application edition being indicated by a corresponding application identifier.

4. The method of claim 3, wherein when the specific application edition is not represented by the source canonical application, determining the set of destination application editions further includes:
  determining whether a title of the specific application edition exactly matches a source title of the source application edition and is programmed for the destination operating system; and
  when the specific application edition has a title that exactly matches the source title, including the destination application identifier of the specific application edition in the set of destination application editions.

5. The method of claim 4, wherein when the title of the specific application edition does not exactly match the source title, determining the set of destination application editions further includes:
  determining whether the title of the specific application edition weakly matches the source title; and
  when the title of the specific application edition weakly matches the source title, including the destination application identifier of the specific application edition in the set of destination application editions.

6. The method of claim 5, wherein the title of the specific application edition weakly matches the source title when the title of the specific application edition and the source title are not exact matches and include identical non-stop words in an identical order.

7. The method of claim 1, wherein when the specific application edition is not represented by the source canonical application, determining the set of destination application editions further includes:
  determining a similarity score of the specific application edition, the similarity score indicating a degree of similarity between the source canonical application and a canonical application representing the specific application edition; and
  determining whether to include the destination application identifier of the specific application edition in the set of destination application editions based on the similarity score thereof.

8. The method of claim 7, wherein the destination application identifier of the specific application edition is included in the set of destination application editions when the similarity score of the specific application edition is one of greatest M similarity scores that correspond to the source canonical application, wherein M is an integer greater than or equal to one.

9. The method of claim 7, wherein the set of destination application editions indicates at least one application identifier of a destination application published by a different publisher than a publisher of the source application edition.

10. A similarity engine comprising:
a memory device; and
a processing device that executes computer readable instructions, the computer readable instructions causing the processing device to:
receive a source application identifier from a user device executing a source operating system, the source application identifier indicating a source application edition programmed for the source operating system;
determine a source canonical application corresponding to the source application edition based on the source application identifier, the source canonical application being representative of one or more application editions including the source application edition;
determine a set of one or more destination application editions that are similar to the source application edition, wherein the set of destination application editions are programmed for a destination operating system that is different from the source operating system, wherein determining the set of destination application editions includes:
when the source canonical application represents a specific application edition, including a destination application identifier of the specific application edition in the set of destination application editions; and
determining a link to a web page of a digital application store corresponding to the destination operating system;
generate a reply based on the set of destination application editions, the reply including display data corresponding to the set of destination application editions and for each destination application, the link to the webpage; and
provide the reply to the user device, wherein the user device displays information corresponding to the one or more destination application editions based on the display data.

11. The similarity engine of claim 10, wherein determining whether the source canonical application represents the specific application edition includes:
determining the source canonical application based on the source application identifier; and
determining whether an application identifier of the specific application edition programmed for the destination operating system is associated with the source canonical application.

12. The similarity engine of claim 11, wherein:
the memory device includes an application database that stores a plurality of records, each record indicating a respective canonical application, each canonical application representing one or more respective application editions whereby the record of the canonical application references the one or more respective application editions and includes application identifiers of the respective one or more respective application editions; and
wherein determining the source canonical application includes querying the application database with the source application identifier to obtain the application record of the source canonical application.

13. The similarity engine of claim 12, wherein when the specific application edition is not represented by the source canonical application, determining the set of destination application editions further includes:
determining whether a title of the specific application edition exactly matches a source title of the source application edition and is programmed for the destination operating system; and
when the specific application edition has a title that exactly matches the source title, including the destination application identifier of the specific application edition in the set of destination application editions.

14. The similarity engine of claim 13, wherein when the title of the specific application edition exactly matches the source title, the destination application identifier of the specific application edition is added to the set of destination application editions if an importance value of the specific application edition is within a tolerance of a source importance value of the source application edition.

15. The similarity engine of claim 14, wherein when the title of the specific application edition does not exactly match the source title, determining the set of destination application editions further includes:
determining, at the processing device, whether the title of the specific application edition weakly matches a source title; and
when the title of the specific application edition weakly matches the source title, including the destination application identifier of the specific application edition in the set of destination application editions.

16. The similarity engine of claim 15, wherein the title of the specific application edition weakly matches the source title when the title of the specific application edition and the source title are not exact matches and include identical non-stop words in an identical order.

17. The similarity engine of claim 10, determining the set of destination application editions further includes:
determining a similarity score of the specific application edition, the similarity score indicating a degree of similarity between the source canonical application and a canonical application representing the specific application edition; and
determining whether to include the destination application identifier of the specific application edition in the set of destination application editions based on the similarity score thereof.

18. The similarity engine of claim 17, wherein the destination application identifier of the specific application edition is included in the set of destination application editions when the similarity score of the specific application edition is one of greatest M similarity scores that correspond to the source canonical application, wherein M is an integer greater than or equal to one.

19. The similarity engine of claim 17, wherein the set of destination application editions indicates at least one application identifier of a destination application published by a different publisher than a publisher of the source application edition.

* * * * *